UNITED STATES PATENT OFFICE.

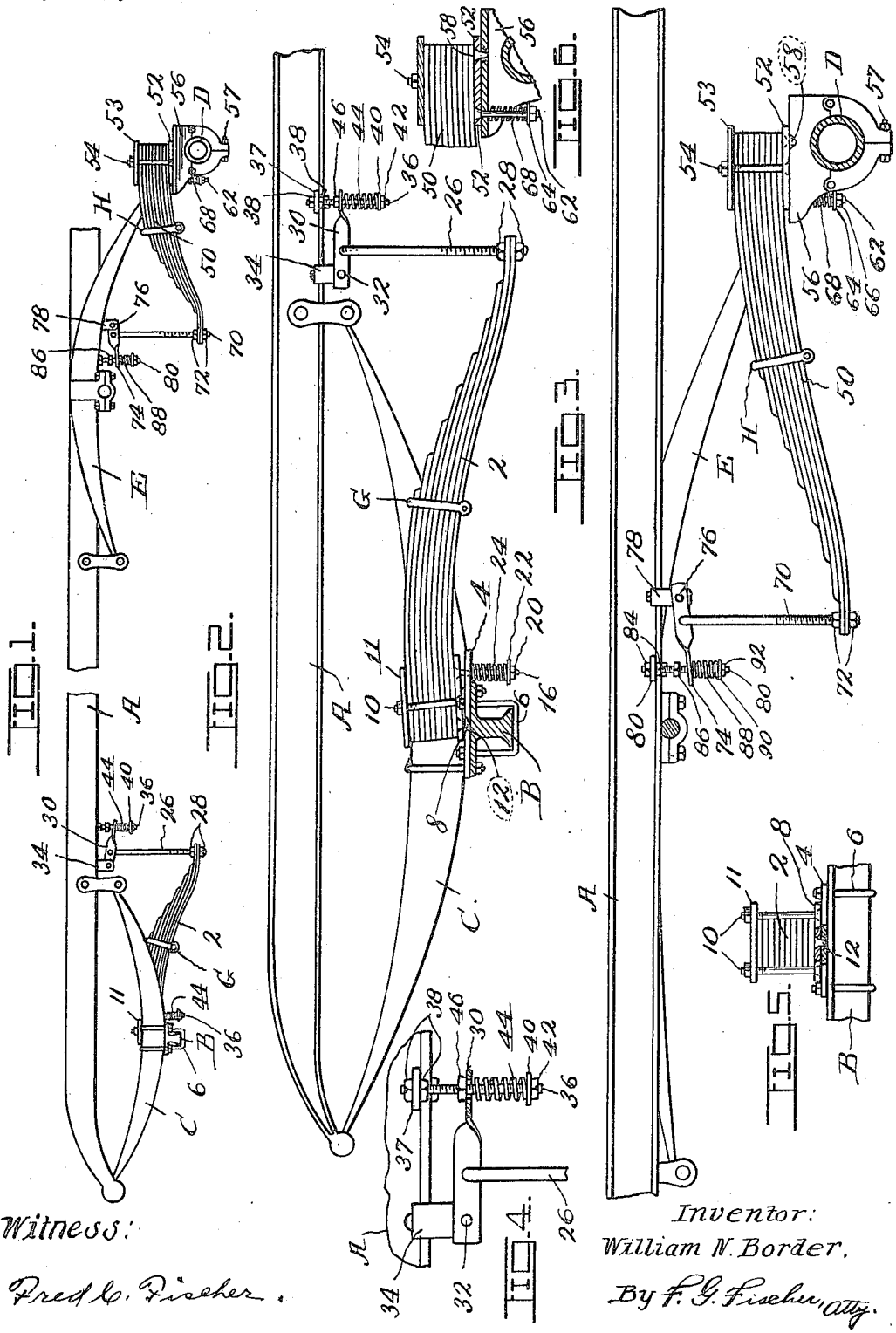

WILLIAM N. BORDER, OF DUNLAP, MISSOURI.

SHOCK-ABSORBER.

1,384,040.   Specification of Letters Patent.   Patented July 12, 1921.

Application filed May 21, 1920. Serial No. 383,200.

*To all whom it may concern:*

Be it known that I, WILLIAM N. BORDER, a citizen of the United States, residing at Dunlap, in the county of Grundy and State of Missouri, have invented certain new and useful Improvements in Shock-Absorbers, of which the following is a specification.

My invention relates to shock absorbers for motor vehicles and one object is to provide a device of this character which will operate in conjunction with the main springs of the vehicle in reducing to a minimum the shocks incident to traveling over rough roads.

A further object is to provide a device which will tend to prevent the wheels of the vehicle from bounding off the surface of the road, to the end that shock to the vehicle and damage to the tires from this cause may be either entirely eliminated or greatly reduced.

Another object is to provide a shock absorber which can be readily installed on different kinds of motor vehicles at little cost, and which is durable and efficient in operation, and can be adjusted to give the best results under different loads.

Other objects will hereinafter appear and in order that the invention may be fully understood, reference will now be had to the accompanying drawing, in which:

Figure 1 is a broken side elevation of certain parts of a motor vehicle equipped with the device.

Fig. 2 is an enlarged sectional view showing one of the devices applied to the forward portion of the vehicle.

Fig. 3 is an enlarged sectional view of one of the devices applied to the rear portion of the vehicle.

Fig. 4 is a fragmentary detail of certain parts disclosed on Fig. 2.

Fig. 5 is a front elevation partly in section of certain parts disclosed on Fig. 2.

Fig. 6 is a fragmentary detail of certain parts disclosed on Fig. 3.

A, designates the side members of the chassis, B the front axle, C the front springs, D the rear axle housing, and E the rear springs of a motor vehicle. The springs C and E perform the usual function of yieldably connecting the spring supported chassis to the axles or unsprung portions of the vehicle.

2 designates a pair of auxiliary springs which are, preferably, of the laminated type the leaves of which are secured by clips G, plates 8 and 11, and bolts 10. The springs 2 and the plates 8 are rockably mounted on plates 4 secured to the axle B by U-bolts 6. The plates 8 are operably-connected to the plates 4 by lugs 12 and bolts 16, which extend through openings in said plates 4. Each rod 16 is equipped with a supplemental coil spring 24 interposed between the associated plates 4 and a washer 22. A nut 20 is threaded upon the rod 16 to support the washer 22 and hold the spring 24 under compression.

The rear end of each auxiliary spring 2 is adjustably secured to the lower end of a connecting rod 26 by jam nuts 28. Each connecting rod 26 extends upwardly and is operably connected to a lever 30, mounted at one end upon a fulcrum 32 carried by a bracket 34 fixed to the adjacent channel bar A. The opposite end of the lever 30 loosely engages a rod 36 depending from a bracket 37 fixed to the adjacent channel bar A. The rod 36 is firmly connected to the bracket 37 by jam nuts 38, and its lower end is provided with a washer 40 and a nut 42. A supplemental coil spring 44 embraces each rod 36 and is interposed between the end of the lever 30 and the washer 40. Upward movement of the lever 30 is limited by a nut 46 threaded upon the rod 36.

The equipment of the rear axle housing D is similar to that of the front axle B and consists of a pair of auxiliary springs 50 and associated parts. Each spring 50 is, preferably, of the laminated type whose leaves are secured together by a clip H, plates 52 and 53, and bolts 54.

The spring 50 and the plate 52 are rockably mounted upon a saddle 56 firmly clamped to the rear axle housing D by bolts 57. Each plate 52 is operably secured to the associated saddle 56 by a depending lug 58 and a bolt 62, which extend freely through openings in the saddle 56. The bolt 62 is provided at its lower end with a washer 64 and a nut 66 for tensioning a supplemental coil spring 68, interposed between said washer 64 and the adjacent portion of the saddle 56.

The forward end of each auxiliary spring 50 is adjustably secured to a connecting rod 70 by jam nuts 72, and the upper end of each connecting rod 70 is operably connected to a lever 74 mounted on a fulcrum 76 carried by a bracket 78 fixed to the adjacent channel bar A.

The forward end of the lever 74 freely engages a rod 80 secured at its upper end to a bracket 82 by a jam nut 84. The bracket 82 like the bracket 78 is secured to the adjacent channel-bar A. The rod 80 is provided at its upper portion with a nut 86 to limit the upward movement of the lever 74, which rests upon a supplemental spring 88 bearing at its lower end against a washer 90 adjustably supported on the rod 80 by a nut 92.

In practice, the auxiliary springs 2 and 50 and the supplemental springs 44 and 88 are tensioned according to the load to be carried by the vehicle. With the construction shown and described, it will be understood that the weight of the load is transferred to the front and rear axles B and D through the medium of the main springs C and E, respectively, and that the arrangement is such that the lesser loads and minor shocks or vibrations are absorbed by the auxiliary springs 44 and 88, while the heavy loads and greater vibrations are absorbed by the auxiliary springs 2 and 50 and the main springs C and E. It will also be understood that rebound of the main springs C and E is largely absorbed and neutralized by the action of the auxiliary springs 2 and 50 and the supplemental springs 44 and 88, so that the riding qualities will be smooth and even.

From the foregoing description it is apparent that I have produced a shock absorber embodying the advantages above pointed out, and while I have shown and described the preferred construction, combination and arrangement of parts, I reserve the right to make such changes as properly fall within the spirit and scope of the claims.

Having thus described my invention, what I claim and desire to secure by Letters Patent, is:

1. In combination with a vehicle provided with main springs, a plate secured to an axle of said vehicle, an auxiliary spring rockably mounted at one end upon said plate, a rod fixed to said auxiliary supplemental spring and extending downwardly through an opening in the plate, a spring embracing said rod and abutting against the plate to resist rocking movement of the auxiliary spring, means for regulating the tension of said supplemental spring, and means connecting the opposite end of the auxiliary spring to a spring-supported portion of the vehicle.

2. In combination with a vehicle provided with main springs, a shock absorber consisting of an auxiliary spring connected at one end to an unsprung portion of the vehicle, a connecting rod secured at its lower end to the opposite end of the auxiliary spring, a lever to which the upper end of said connecting rod is secured, a fulcrum to said lever, a support for said fulcrum secured to a spring-supported portion of the vehicle, a rod secured to a spring-supported portion of the vehicle and extending through an opening in the free end of the lever, means on said rod to limit the upward movement of the lever, a supplemental spring embracing the rod and bearing against the underside of the lever to resist downward movement thereof, and means for regulating the tension of said supplemental spring.

In testimony whereof I affix my signature, in the presence of two witnesses.

WILLIAM N. BORDER.

Witnesses:
FRED C. FISCHER,
L. J. FISCHER.